United States Patent
Bönsel et al.

(10) Patent No.: US 6,197,147 B1
(45) Date of Patent: Mar. 6, 2001

(54) PROCESS FOR CONTINUOUS PRODUCTION OF MEMBRANE-ELECTRODE COMPOSITES

(75) Inventors: Harald Bönsel, Waldems; Joachim Clauss; Gregor Deckers, both of Frankfurt; Georg Frank, Tübingen; Arnold Schneller, Messel; Helmut Witteler, Beindersheim; Mike Römmler, Berlin; Michael Heine, Allmanshofen, all of (DE)

(73) Assignee: Hoescht Research & Technology Deutschland GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 09/091,659

(22) PCT Filed: Dec. 20, 1996

(86) PCT No.: PCT/EP96/05792

§ 371 Date: Apr. 5, 1999

§ 102(e) Date: Apr. 5, 1999

(87) PCT Pub. No.: WO97/23919

PCT Pub. Date: Jul. 3, 1997

(30) Foreign Application Priority Data

Dec. 22, 1995 (DE) ............................. 195 48 421

(51) Int. Cl.[7] ............................................. B32B 31/00
(52) U.S. Cl. .................. 156/269; 156/281; 156/324; 429/42
(58) Field of Search ................................. 156/269, 281, 156/324; 429/42

(56) References Cited

U.S. PATENT DOCUMENTS

| | | | |
|---|---|---|---|
| 4,161,815 | * 7/1979 | Land et al. ..................... | 29/623.4 |
| 4,215,183 | * 7/1980 | MacLeod ......................... | 429/30 |
| 4,383,010 | * 5/1983 | Spaepen ........................... | 429/42 |
| 4,437,952 | * 3/1984 | Smith et al. ................. | 264/171 X |
| 4,569,730 | 2/1986 | Killer . | |
| 4,579,612 | * 4/1986 | Held ................................ | 156/64 |
| 4,826,554 | 5/1989 | McIntyre et al. . | |
| 5,010,050 | * 4/1991 | Wullenweber et al. ......... | 502/301 |
| 5,146,391 | * 9/1992 | MacFarlane et al. ....... | 29/25.03 X |
| 5,211,984 | 5/1993 | Wilson . | |
| 5,494,550 | * 2/1996 | Benge ............................ | 156/268 |
| 5,561,202 | 10/1996 | Helmer-Metzmann et al. . | |
| 5,645,932 | * 7/1997 | Uchibori ......................... | 428/347 |
| 5,723,086 | 3/1998 | Ledjeff et al. . | |

FOREIGN PATENT DOCUMENTS

| | | |
|---|---|---|
| 4241150 C1 | 6/1994 | (DE) . |
| 0574791 A2 | 12/1993 | (EP) . |
| 1090994 | * 11/1967 | (GB) . |
| 6223836 | 8/1994 | (JP) . |

* cited by examiner

Primary Examiner—Mark A. Osele
(74) Attorney, Agent, or Firm—Frommer Lawrence & Haug LLP

(57) ABSTRACT

A process for producing laminates which contain at least one centrally arranged, ion-conductive membrane which is, at least over a substantial part of its two mutually opposite flat faces, electrically conductively bonded to at least one catalytically active substance and to at least one two-dimensional, gas-permeable, electron-conductive contacting material, the bonding of at least two of the said components having been effected by lamination. The process comprises carrying out the bonding of the ion-conductive membrane, of the catalytically active substance and of the electron-conductive contacting material continuously. The ion-conductive membrane is brought together with at least the electron-conductive contacting material in the exact position by means of transport and feeding devices and the two components are laminated and bonded to one another by pressing them together. The range of variation in the a.c. resistances of the laminates produced by the process according to the invention is ±10%. The laminates are particularly suitable for use in fuel cells or electrolysers.

28 Claims, 5 Drawing Sheets

PROCESS FOR CONTINUOUS PRODUCTION OF MEMBRANE-ELECTRODE COMPOSITES

Fuel cells are electrochemical systems which can convert chemical energy into electrical energy. Thus, a hydrogen/oxygen fuel cell converts these gases into water with a release of electrical energy.

Fuel cells are composed of an array of a plurality of membrane/electrode assemblies, separated by bipolar plates, a so-called stack, the membrane/electrode assemblies (MEA) in turn being constructed from two catalytically active electrodes for the electrochemical conversion of the chemical substances and an ion-conductive electrolyte between the electrodes for the charge transport. The bipolar plates serve to separate the gas spaces and to connect the individual cells electrically. Modern fuel cell designs operating at low temperatures do not contain any liquid electrolytes but conductive polymeric ion exchanger membranes (polymeric solid electrolytes).

The currently most promising production processes for membrane/electrode assemblies are an impregnation process and a casting process, each of which is followed by hot-pressing of the components.

In the impregnation process, a dissolved solid electrolyte is spread on the electrode surface, or it is sprayed on as an emulsion by means of a pressurized gas; it is capable of penetrating for a few micrometers into the pore system. The prepared electrodes are then pressed with heating until the electrode membrane fuses with them. Such a process for producing membrane/electrode assemblies is described, for example, in U.S. Pat. No. 5,211,984, where a cation exchanger membrane is coated with a cation exchanger solution in which a platinum catalyst is suspended. This process is also known under the term "ink process".

In casting, the dissolved solid electrolyte is mixed with the catalyst material and, if appropriate, a waterproofing agent, for example polytetrafluoroethylene (PTFE), to give a paste. This is either applied first to a carrier or spread directly on the membrane and then hot-pressed together with the latter, in order to minimize the contact resistances at the transitions between the membrane and the solid electrolyte layers located in the paste or on the electrode.

A further process for producing electrode/membrane composites from an ion exchanger material forming a core region and fuel cell electrodes contacted with both faces thereof is described in DE-C-4,241,150. The ion exchanger material is here formed from homopolymers or copolymers soluble in a solvent and having at least one radical which can dissociate into ions.

All preparation processes for gas diffusion electrodes with polymer membranes require a large number of in most cases manual working steps which are difficult to automate. Methods which are acceptable for experiments on laboratory scale frequently lead in industrial manufacture to insuperable obstacles, above all because of the high costs.

Even though fuel cells are already in use in the space travel industry, a general commercial use in the automobile industry, for example, is not foreseeable in the near future, since the production costs, in particular for membrane/electrode assemblies and the fuel cells resulting from them, are several orders of magnitude above the costs for conventional internal combustion engines. Also for use in the decentralized energy supply, the now available fuel cells are too expensive, for example as compared with oil heating and gas heating or diesel generators.

For the use in a car, however, fuel cells in conjunction with an electric drive represent a new drive concept which has some advantages. Thus, in the case of a fuel cell operated, for example, with hydrogen and oxygen, there is no pollutant emission at the vehicle, and the emission of the entire energy conversion chain is lower than in other vehicle drive systems. Moreover, the overall efficiency relative to the primary energy is significantly higher. The use of fuel cells in the automobile industry would make a noticeable contribution to the reduction of traffic-related pollutant emissions and the consumption of energy resources.

It is therefore the object to provide a process for producing laminates, in particular membrane/electrode assemblies suitable for use in fuel cells, which process allows the manufacture thereof in such a way that the production costs and the performance satisfy the requirements of the users.

The present invention achieves this object by providing a process for producing laminates, i.e. composites obtainable by bonding at least two components, in particular membrane/electrode assemblies, which contain at least one centrally arranged, ion-conductive membrane which is, at least over a substantial part (>50%) of its two mutually opposite flat faces, bonded to at least one catalytically active substance and to at least one two-dimensional, gas-permeable, electron-conductive contacting material, the bonding of at least two of the said components having been effected by lamination. The process comprises carrying out the bonding of the ion-conductive membrane, of the catalytically active substance and of the electron-conductive contacting material continuously.

Figure 1:
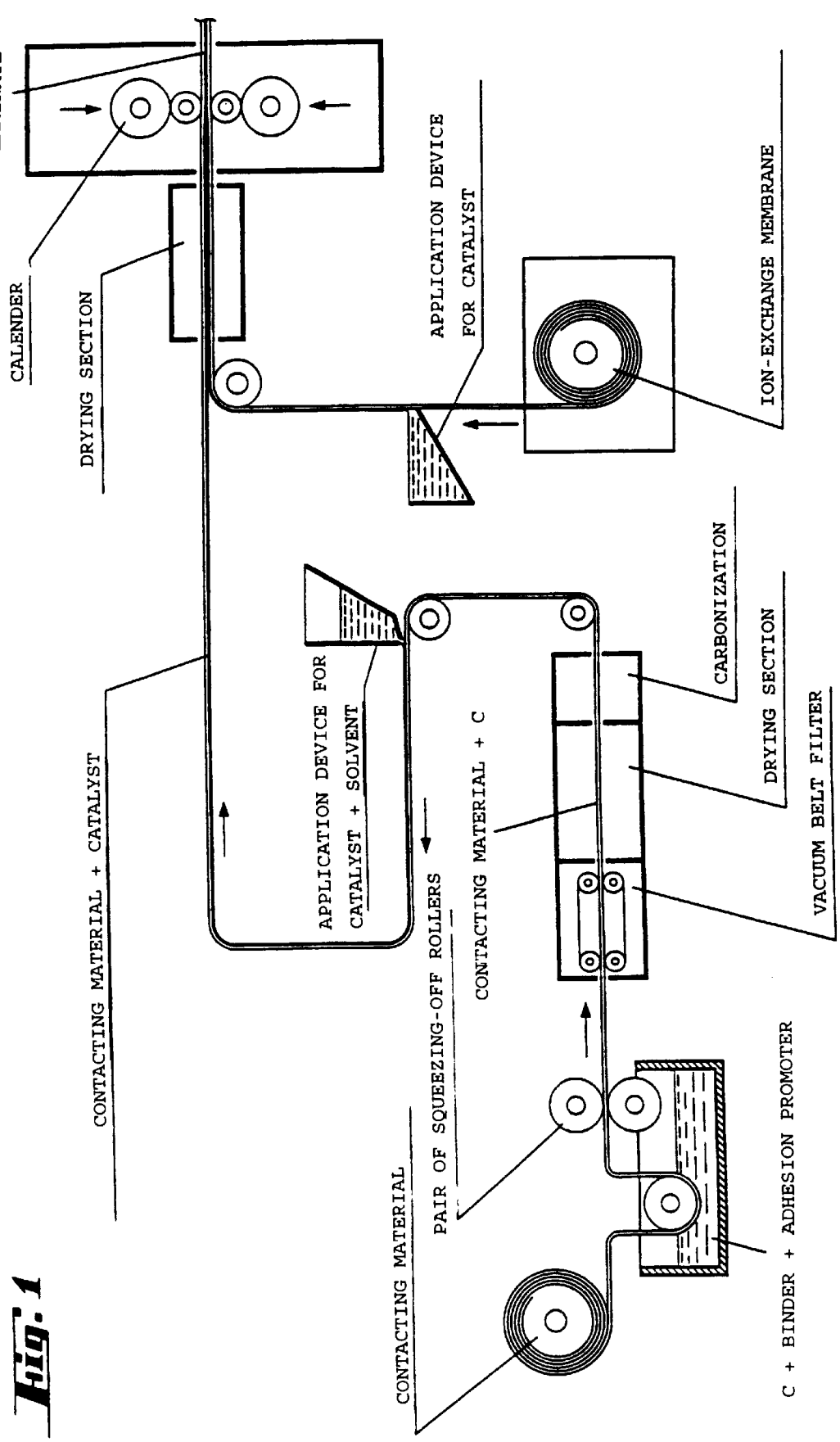
FIG. 1 shows a schematic drawing of a continuous lamination device.

The ion-conductive membrane is continuously brought together with at least the electron-conductive contacting material, the membrane and/or the contacting material being coated with a catalyst, in the exact position by means of a transport and feeding device, and at least these two components are laminated and bonded to one another by pressing them together on a roller arrangement (FIG. 1).

Examples of electron-conductive contacting materials which can be used are all two-dimensional carbon fiber structures which possess an electrical conductivity, preferably an electrical conductivity of >0.01 Ωm, and have a porosity within their structure which permits an adequate gas diffusion process.

In addition to composite materials which contain carbon in the conductive modification, however, metals, in particular stainless steel, nickel and titanium can also be used, preferably as powders, granules, papers, fibers, felts, nonwovens, fabrics, sintered plates or combinations thereof, in particular two-dimensional mesh structures of metal or metal oxides of sufficient conductivity.

Structures are here especially preferred which, depending on the metal or metal oxide used, have a thickness in the range from 0.01 to 1 mm, preferably from 0.025 to 0.25 mm, and a mesh width in the range from 0.001 to 5 mm, preferably 0.003 to 0.5 mm. In the case of carbon structures, thicknesses in the range from 0.05 to 5 mm are preferred, especially from 0.1 to 2 mm. The weight per unit area of the carbon structures is in this case in the range from 5 to 500 $g/m^2$, in particular in the range from 20 to 150 $g/m^2$, and the porosity is in the range from 10 to 90%, preferably 50 to 80%.

In a preferred embodiment of the invention, graphitized two-dimensional carbon fiber structures are used. In particular the following contacting materials are used:

carbon fiber papers (for example $^R$SIGRATHERM PE 204, PE 704, PE 715), carbon fiber fabrics (for example $^R$SIGRATEX SPG 8505 and KDL 8023, KDL 8048), carbon fiber felts (for example $^R$SIGRATHERM KFA 5 and GFA 5), carbon fiber nonwovens (for example $^R$SIGRATEX SPC 7011 and SPC 7010 or TGP-H120 (Toray)) and composite carbon fiber structures (for example $^R$SIGRABOND 1001 and 1501 and 3001).

In a further development of the invention, the fibers and contact points of the fibers can additionally be coated with a layer of carbon in order to increase the conductivity of the two-dimensional carbon fiber structure.

A variant for producing such a two-dimensional fiber structure comprises the use of polyacrylonitrile fabrics and nonwovens which have been converted directly into the carbonized/graphitized form via a special direct oxidation process, so that the expensive detour via the process of producing individual filaments and the subsequent further processing to give two-dimensional fiber structures can be by-passed (German Patent Application P 195 17 911.0).

Materials of particular interest for the ion-conductive membrane are generally those which show properties of the solid state in one part of their structure and those of the liquid state in another part, and are thus dimensionally very stable but also conduct protons very well. Polymers suitable for this purpose are those which have a radical which can dissociate into ions. Preferably, cation-conductive membranes are used. The ion conductivity for protons is preferably 0.5 to 200 mS/cm, especially 5 to 50 mS/cm. The membrane thickness is preferably in the range from 0.1 $\mu$m to 10 mm, in particular from 3 $\mu$m to 1 mm. Moreover, it must be ensured in the processing of the polymers to give the membrane, that the latter is gas-tight.

The base materials for the ion-conductive membrane can be homopolymers and copolymers or mixtures thereof, which can be obtained as viscous solutions or dispersions with suitable liquids and can be processed to give membranes. If mixtures are used, at least one component of the mixture must be ion-conductive, while other components of the mixture may indeed be insulators for the ion conductivity which, however, on the other hand, confer, for example, certain mechanical properties or a hydrophobic character to the membrane.

In particular, polymers can be used which have a high mechanical stability, a high temperature resistance and an adequate resistance of chemicals for the use as a membrane material in electrochemical cells.

Polymers which can be used according to the invention are described in, for example, DE-C-4,241,150, U.S. Pat. No. 4,927,909, U.S. Pat. No. 5,264,542, DE-A-4,219,077, EP-A-0,574,791, DE-A-4,242,692; DE-A-19 50 027 and DE-A-19 50 026 and in DE-A-19 52 7435. These specifications are incorporated herein by reference.

Polymers with dissociable groups are preferably used as ion-conductive materials for the membrane which can be employed according to the invention. The dissociable groups can either be covalently bound functional groups (for example $-SO_3M$, $-PO_3MM'$, COOM and others (M,M'= H, $NH_4$, metals)) or acids which are present as swelling agents in the polymer (for example $H_3PO_4$ or $H_2SO_4$). Preferred are polyarylenes with covalently bound dissociable groups, fluorinated polymers with covalently bound dissociable groups or basic, acid-swollen polymers with aryl rings. Particularly preferred polyarylenes have, as the main chain, a polyarylether-ketone, a polyarylether-sulfone, a polyaryl sulfone, a polyaryl sulfide, a polyphenylene, a polyarylamide or a polyaryl ester. Likewise particularly preferred are polybenzimidazoles (PBI), containing dissociable acid groups (for example PBI swollen with $H_3PO_4$). Mixtures containing at least one of the abovementioned polymers are also suitable.

In a further preferred embodiment, completely fluorinated polymers can also be present, i.e. those which contain C—F bonds in place of C—H bonds. These are very stable against oxidation and reduction and are in some ways related to polytetrafluoroethylene. It is particularly preferred when such fluorinated polymers also contain water-attracting (hydrophilic) sulfonic acid groups ($SO_3H$) in addition to the water-repellent (hydrophobic) fluorine groups. These properties are present, for example, in the polymers known under the brand name $^R$Nafion.

Polymers of this type are, in their swollen state (caused by the water absorption), relatively stable dimensionally due to their hydrophobic, solid-like skeleton, on the one hand, and show very good proton conductivity in their hydrophilic, liquid-like regions, on the other hand.

Catalysts which can be used for the production of membrane/electrode assemblies by the process according to the invention are generally all electrochemical catalysts which catalyze the redox reactions $2H_2/4H^+$ and $O_2/2O^{2-}$. These substances are in most cases based on elements of the 8th subgroup of the Periodic Table, it being possible for substances to be additionally present which are based on elements from other groups of the Periodic Table. Those metals or compounds thereof are also used which catalyze the conversion of methanol and water to carbon dioxide and hydrogen at low temperatures. In particular, metals, oxides, alloys or mixed oxides of these elements are used as catalysts.

The gas-permeable, electrically conductive structure serving as electrode can be converted by coating with the catalyst into the active form which ensures the electrical contact. Generally, both the ion-conductive membrane and the electron-conductive contacting material or both can be coated with the catalyst by the process according to the invention. The catalyst concentration of the ion-conductive membrane or on the contact material is usually in the range from 0.001 to 4.0 $mg/cm^2$, the upper limit of the catalyst concentration being given by the catalyst price and the lower limit given by the catalytic activity. The application and bonding of the catalyst take place according to the known processes.

Thus, for example, it is possible to coat the contacting material with a catalyst suspension containing the catalyst and a solution of the cation exchanger polymer. The cation exchanger polymers can generally be all the ion-conductive polymers mentioned above.

Preferably, metals or alloys of metals selected from the 1st, 2nd and 8th subgroup of the Periodic Table and also Sn, Re, Ti, W and Mo are used as catalytically active materials, in particular Pt, Ir, Cu, Ag, Au, Ru, Ni, Zn, Rh, Sn, Re, Ti, W and Mo. Further examples of catalysts which can be used according to the invention are platinum, gold, rhodium, iridium and ruthenium catalysts applied to support materials, for example $^R$XC-72 and $^R$XC-72R made by E-TEK.

The catalyst can be deposited on the material to be coated by a chemical reaction (DE-A-4,437,492.5). Thus, for example, it is possible to impregnate the membrane and/or the contacting material with hexachloroplatinic acid and to deposit elemental platinum by using a reducing agent, for example hydrazine or hydrogen (JP 80/38,934). Platinum can be applied from an aqueous solution which preferably contains $(Pt(NH_3)Cl_2)$ (U.S. Pat. No. 5,284,571).

Examples of further possibilities for bonding the catalyst are sputtering, the CVD process (chemical vapor deposition), cold plasma deposition, the physical vapor deposition process (PVD), electron beam vaporization and electrochemical deposition on the material to be coated. Furthermore, an activation of rare metals can be effected via ion exchange on oxidatively modified carbon blacks and subsequent reduction.

Coating of the two-dimensional fiber structure with a catalyst suspension, which already contains the catalyst as such, for example metallic platinum, has proven to be particularly appropriate in the process according to the invention. In particular with a view to uniform distribution of the catalyst component and the later bonding of the electrode structure to the cation exchanger membrane, considerable advantages result.

For example, a blade arrangement in combination with a hot roller (FIG. 1) or an application device such as is known from continuous prepreg fabrication are suitable for applying the suspension of actively effective catalyst.

The fiber structure thus impregnated, which is the so-called gas diffusion electrode, can then be wound up or fed directly in ribbon form to the continuous process for producing a membrane/electrode assembly (MEA).

Figure 2:
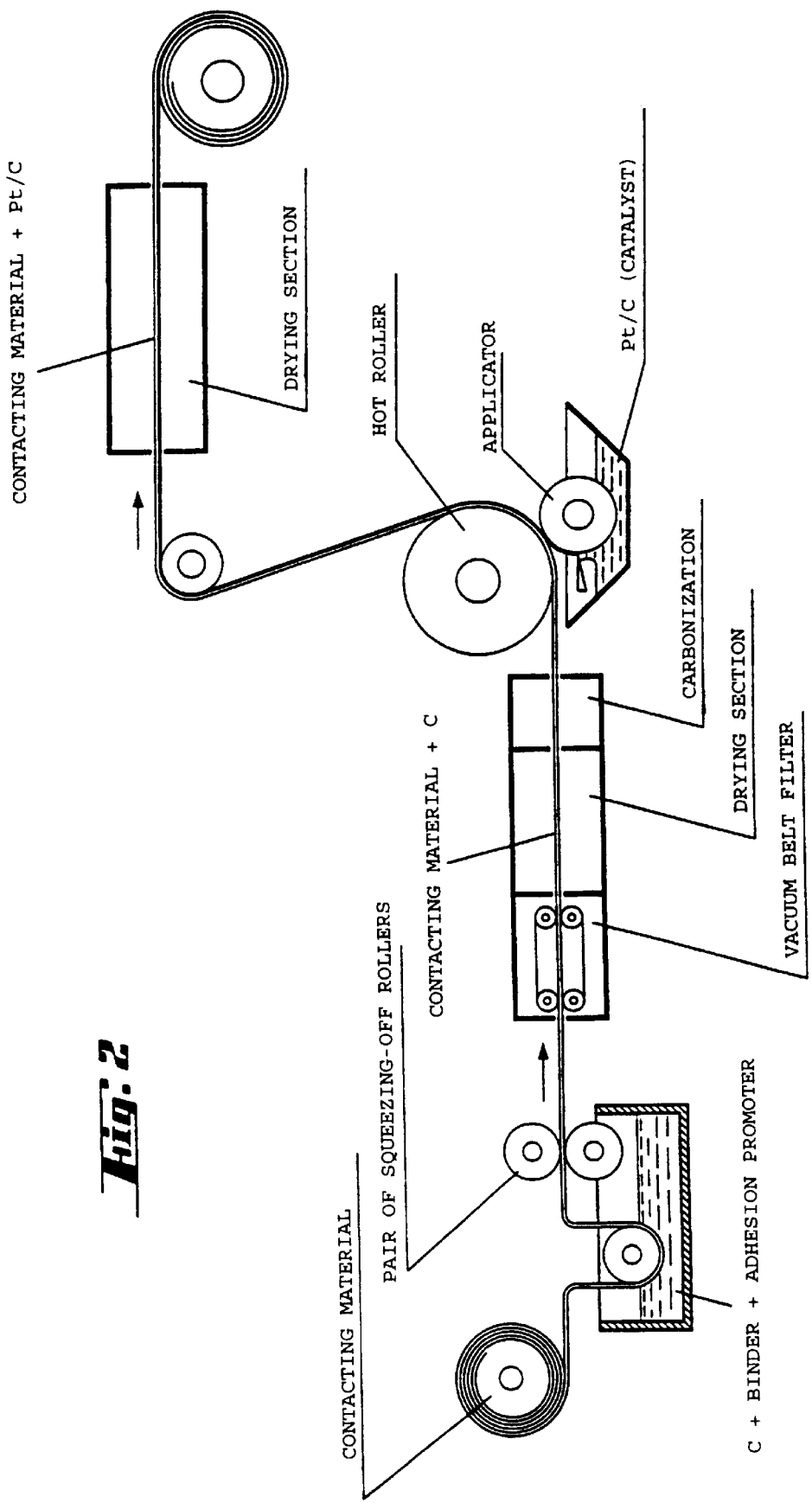
FIG. 2 shows a schematic drawing of a catalyst coating device.

Both the surface quality of the ion-conductive material and the fixing of the catalyst suspension can be influenced by a preceding dipping bath. The open pore volume of the two-dimensional fiber structure and the bonding to the phase boundary on the one hand and the adhesive power for the bonding of the catalyst suspension on the other hand can be adjusted by the selection of suitable adhesion promoters and binders as well as fillers (FIG. 1 and FIG. 2). In this step, advantageously an arrangement of a vacuum belt filter followed by a controllable drying section is used.

The consistency/degree of drying of the applied catalyst suspension can then be adjusted such that a subsequent lamination can be carried out in an optimum manner.

If the gas diffusion electrode should first be rolled up before it is processed further, sticking of the electrode to itself can be prevented by the selection of a suitable separating paper which is wound up together with it.

The electron-conductive contacting material is then continuously brought together with the ion-conductive membrane in the exact position, and the ion-conductive membrane is then laminated and bonded on at least one of its flat faces to the contacting material on a roller arrangement.

In a variant according to the invention, the contacting material can, if it is laminated to both flat faces of the ion-conductive membrane, contain a different catalyst for each face of the membrane. In addition to the ion-conductive membrane, two contacting materials, which may be composed of different materials, can also be used as starting materials.

In an alternative embodiment, the electron-conductive contacting material can first be continuously coated and laminated in each case to one face of the ion-conductive membrane, and these two coated half components (half membrane/electrode assemblies) are then, after wetting or incipient dissolving of the ion-conductive surface, fitted together and laminated by pressing them together to give a membrane/electrode assembly. In this variant again, either half membrane/electrode assemblies comprising components made of the same materials, i.e. the same electron-conductive contacting material and ion-conductive membrane composed of the same polymer, or half membrane/electrode assemblies of different composition, i.e. a different ion-conductive membrane and/or a different contacting material and/or a different catalyst, can be used.

In order to improve the adhesion between the membrane and the contacting material, the membrane can, if appropriate, be at least partially plasticized before the lamination process either by swelling in a non-solvent, for example water, acetone, methanol or another aliphatic alcohol, or by swelling in mixtures of a solvent, preferably a predominantly polar aprotic solvent, for example N-methylpyrrolidone (NMP), dimethyl sulfoxide (DMSO), dimethylformamide, g-butyrolactone, or protic solvents such as, for example, sulfuric acid or phosphoric acid or a non-solvent.

Moreover, to improve the adhesion and to bond the components, the contacting material or at least one flat face of the membrane or both components can be incipiently dissolved, wetted or incipiently swollen by a solvent or by a polymer solution, and the components, i.e. one or both flat faces of the ion-conductive membrane and at least one electron-conductive contacting material, can then be fitted together by pressing and bonded by lamination.

The coating of the components can be carried out either with pure solvent or with a polymer solution, in which case the polymer concentration can amount to 0 to 100% by weight, preferably 5 to 50% by weight. Polymers which can be used for the preparation of the coating solutions are the abovementioned ion-conductive polymers. Preferably, a polymer solution of the polymer forming the ion-conductive membrane is used for coating. The coating is applied particularly in a layer thickness from 1 to 200 $\mu$m, especially 5 to 100 $\mu$m. In this case, either the contacting material or at least one of the flat faces of the ion-conductive membrane can be coated with a catalytically active substance. In a further variant according to the invention, the catalyst can be present in the coating material promoting adhesion, i.e. in the solvent or in the polymer solution which is to be applied.

The coating or so-called conditioning of the ion-conductive membrane takes place via a slot die, if an application of solvent or polymer solution to one face is concerned. Suitable slot dies according to the invention are dies having a width in the range from 0.1 to 5 m and a slot width in the range from 10 to 1000 $\mu$m.

For coating, the membrane is taken past the slot die either in the horizontal direction (above or below the die) or in the vertical direction (ascending or descending). In the case of conditioning on both faces of the membrane, the application of the solvent or polymer solution can be carried out correspondingly by passing the membrane through by means of two slot dies or by conditioning of the membrane in a dipping bath which contains the solution to be coated.

Alternatively, the membrane can be coated by taking it past a blade. The width of the blade is preferably in the range from 0.1 to 5 m with a slot width in the range from 5 to 500 µm. The ribbon speed is in this case especially between 0.5 mm/second and 10 m/second, preferably 5 mm/second to 1 m/second.

For lamination, the individual components, i.e. at least one electron-conductive contacting material and at least one ion-conductive membrane, are brought together by means of feeding and positioning devices and laminated to one another between pairs of rollers or in a press. Preferably, the contacting material and/or the ion-conductive membrane are brought together as two-dimensional structures and laminated at a temperature in the range from 5 to 300° C., especially 25 to 200° C., and a suitable contact pressure, preferably in the range from $10^7$ to $10^{12}$ Pa, especially $10^8$ to $10^{10}$ Pa. It is to be noted here that the contact pressure in the case of using rollers is frequently greatly dependent on the shape and size of the rollers. By means of this lamination process, the electrode structure is pressed directly into the upmost incipiently dissolved or incipiently molten layer of the ion-conductive membrane.

The production of a composite electrode membrane from two half membrane/electrode assemblies is correspondingly effected by incipiently dissolving the ion-conductive membrane of one or both half membrane/electrode assemblies with a solvent or polymer solution, positioning and feeding the two assemblies to the pairs of rollers and lamination thereof to give a complete membrane/electrode assembly.

The diameter of the pairs of rollers used according to the invention is preferably in the range from 0.1 to 2 m.

In a special embodiment, the ion-conductive membrane can be laminated to a contacting material which has already been cut into ready-to-use units adapted to the intended later use, for example in the form of pieces of carbon nonwoven whose shape and size correspond to the carbon nonwovens used in a fuel cell. According to the invention, the units can be unrolled in such a way that the distance between the units corresponds to twice the width of the uncoated membrane rim, required in a fuel cell, preferably 0.1 to 100 mm, especially 1 to 50 mm. The advantage of this process variant according to the invention is above all a saving of process steps during the subsequent further processing of the resulting membrane/electrode assemblies to give fuel cells.

The laminates of electron-conductive contacting material, catalyst and ion-conductive membrane obtained by the continuous process according to the invention are freed from still adhering superfluous components in a continuous stage downstream of the lamination and coupled thereto.

One possibility for such a conditioning comprises, for example, passing the laminate in ribbon form through a drying section, for example a circulating air oven, heated to 10 to 250° C., especially 20 to 200° C. In this way, still adhering solvent residues or water are evaporated. In a particular embodiment, there can be a temperature gradient in the drying section along the direction of motion.

A further possibility for removing the volatile constituents comprises drying the laminate by means of infrared radiation, in particular in combination with a downstream circulating-air dryer.

In a further process variant, the removal of the superfluous, still adhering components can take place in a downstream washing step. Thus, for example, still adhering solvents or non-solvents or polymer components can be extracted by a liquid which does not dissolve the membrane-forming polymers. For example, water/NMP mixtures and mixtures of NMP and lower aliphatic alcohols are used here. The NMP content is then preferably below 25%. In particular, the extraction in this variant takes place by spraying the laminate with the liquid or by passing the laminate ribbon with the aid of deflection rollers through an appropriate dipping bath. After the extract has dripped off, the laminate is subjected to a subsequent drying process. The drying of the laminate can be carried out as described above.

In order to bring the laminate obtained by the process according to the invention already into a form suitable for incorporation in a fuel cell, a so-called finishing step can follow the conditioning stage as a further process step.

In this case, the laminate present as a ribbon can be divided at appropriate regular distances adapted to the further intended use by means of suitable cutting or punching machines. If pieces of carbon nonwoven have already been used as contacting material in the production of the laminate, the laminate ribbon is cut up in the uncoated regions, so that the pieces of laminate thus obtained are coated only in the central region, but not at the rim.

Moreover, it is possible to apply self-curing sealing materials to the outer, uncoated or to the coated rim zone of the laminate in a subsequent coupled step, so that the contacting material is no longer gas-permeable (U.S. Pat. No. 5,264,299). In particular, curable silicone resins can here be used as sealing materials, which are applied in a liquid form and fully cure spontaneously. During the subsequent incorporation of the laminate or of the membrane/electrode assembly into a fuel cell, the sealing material thus applied serves for lateral sealing of the cell and for preventing egress of fluids and the outflow of fuel gases or oxidizing gases.

A determination of the a.c. resistances can provide information about the reproducibility of the production of the laminates. In the case of laminates from one batch, the resistance also correlates to the power, but not between different laminates. Laminates produced by the known discontinuous processes show a.c. resistances which vary between 10 mΩ and 10 Ω. The products thus obtained frequently contain distortions, air inclusions or similar defects. By contrast, the continuous process according to the invention leads to uniform bonding of the electrode structure to the ion-conductive membrane and regularly to laminates having a range of variation of ±10%, especially ±5% (measured in the ready-to-operate state). The resistances of the membrane/electrode assemblies obtained by the process according to the invention are usually in the range from 0.02 to 0.6 Ω, in particular in the range from 0.04 to 0.45 Ω. Using the process according to the invention, laminates, in particular membrane/electrode assemblies and/or composite electrode membranes, can be produced in a simple, economical and easily reproducible manner. Therefore, and owing to their low a.c. resistances, they are especially suitable for incorporation into fuel cells and electrolysis.

The invention is explained in more detail below by reference to exemplary embodiments and to the attached figures.

EXAMPLES

Example 1

Figure 3:
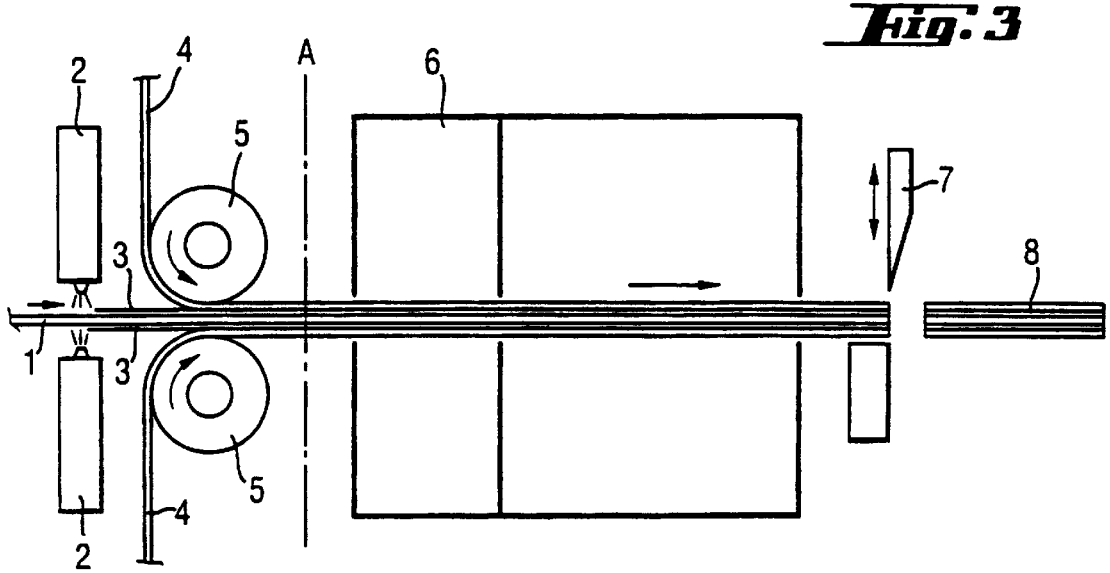
FIG. 3 shows a schematic drawing of an apparatus for continuous laminating three webs followed by cutting.

Membrane material (FIG. 3, 1): Sulfonated polyaryletherketone of the formula (1), prepared according to EP 0,574, 791, ion exchanger equivalent 1.4 mmol/g, thickness 100 µm, roll form, width 400 mm.

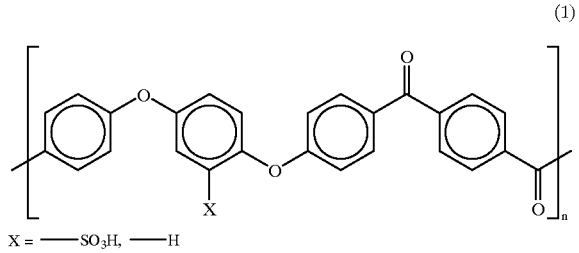

X = ——SO₃H, ——H

Coating material (FIG. 3, 3): Mixture composed of
15 g of sulfonated polymer identical to the membrane material,
15 g of platinum catalyst (30% of Pt/Vulcan XC-72, made by E-TEK, Inc. Natick, USA),
70 g of N-methylpyrrolidone.

Carbon fabric (FIG. 3, 4): VP 676, made by SGL Carbon GmbH, Wiesbaden, Germany. The membrane (1) is passed through between two slot dies (2) (width of the die 370 mm, slot width 500 µm) at a speed of 5 mm/second; during this, a coating (3) of 100 µm thickness is applied to both faces of the membrane. Downstream of the slot dies, carbon fabric (4) is shot in on both sides via two rollers (5) (width 450 mm, diameter 200 mm), so that a laminate is formed. The upper roller exerts a force of 1000 N on the laminate running underneath. The laminate in the form of a ribbon is passed through a two-chamber oven (6) (length 3 m), in which the NMP is removed from the coating material (3). The first chamber (length 1 m) is heated to 120° C., the second chamber (length 2 m) is heated to 80° C. Downstream of the oven, the laminate is divided into pieces (8) by continuously operating parallel sheers (7); the width of the pieces is given by the width of the laminate ribbon, and the length of the pieces is 500 mm. The laminate thus obtained can be incorporated as a membrane/electrode assembly into a membrane fuel cell and delivers there in hydrogen/oxygen operation (each at 2 bar and 80° C.) a maximum electric power of 3.1 kW/m².

Example 2

Figure 4:
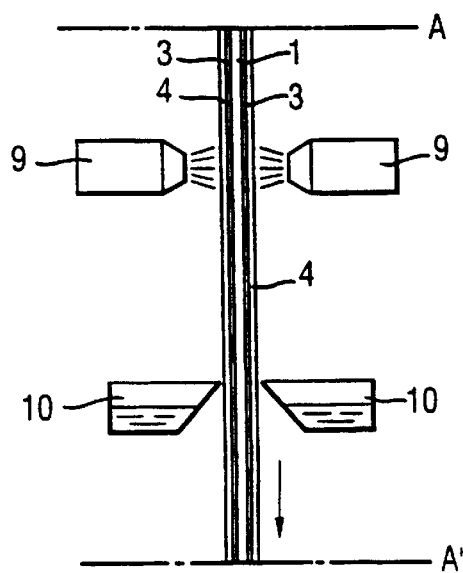
FIG. 4 shows an optional insertion into the apparatus of FIG. 3.

Variant to Example 1. After the carbon fabric (FIG. 3) has been rolled on, the laminate is introduced via a deflection roll (diameter 1 m) into the apparatus sketched in FIG. 4 at the point marked A. Water (25 m/second) is sprayed through two nozzle heads (9) onto both sides of the membrane, the water extracting NMP out of the coating. 0.5 m below the nozzle heads, there are outflow troughs (10) for the sprayed-on water on both sides of the laminate ribbon. The laminate is then passed via a deflection roll into the oven (6) (both chambers at 80° C.; downstream of the oven, there are additionally in each case two commercially available 150 W IR-lamps 100 mm above and below the laminate) and further treated as in Example 1. The laminate thus obtained can be incorporated as a membrane/electrode assembly into a membrane fuel cell and delivers there in hydrogen/oxygen operation (each at 2 bar, 80° C.) a maximum electric power of 3.8 kW/m².

Example 3

Figure 5:
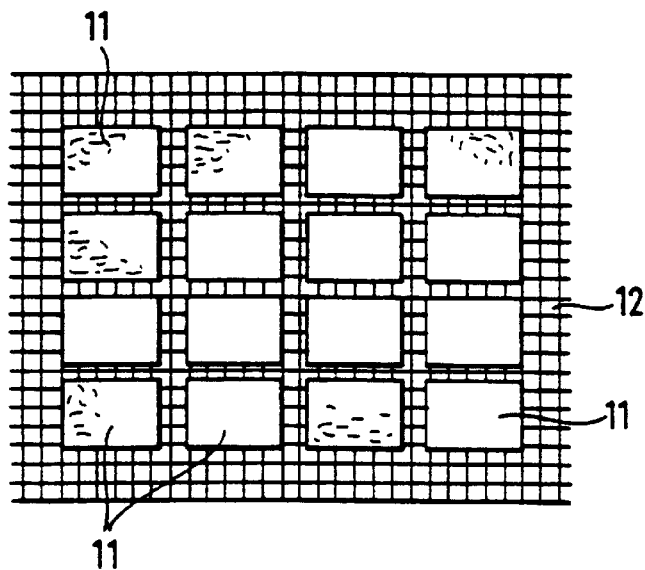
FIG. 5 shows a net with discrete nonwoven pieces pressed thereon.
Figure 6:
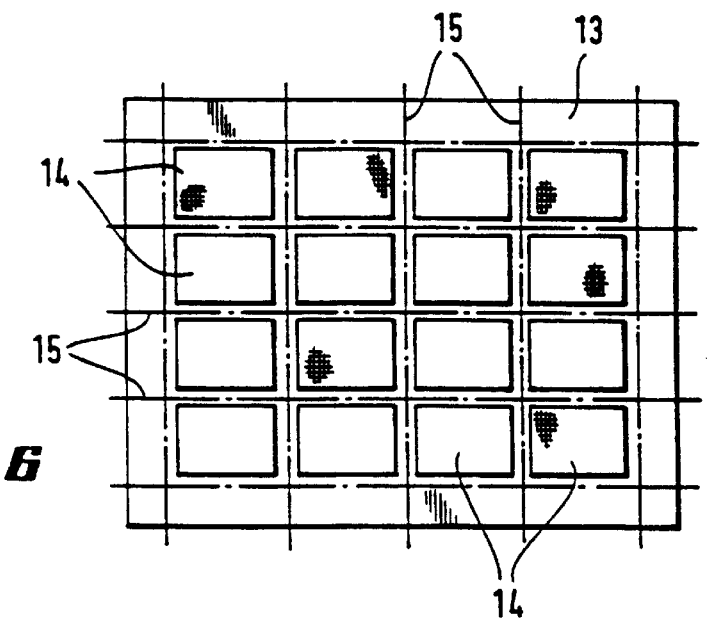
FIG. 6 shows the laminate of FIG. 5 with further processing.
Figure 7A:
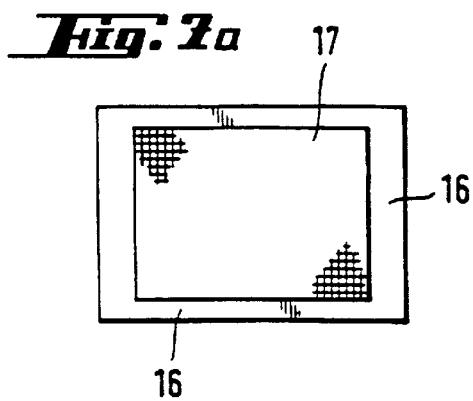
FIG. 7a shows a top view of a segment cut from the laminate of FIG. 5.
Figure 7B:
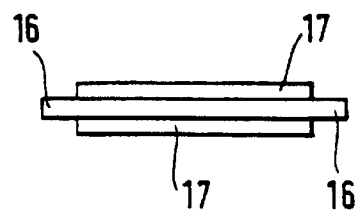
FIG. 7b shows a side view of a segment cut from the laminate of FIG. 5.

For the following embodiment, a laminate of a commercially available carbon nonwoven (TGP-H-120, made by Toray, Tokyo, Japan), which has been coated with 40 g/m² of platinum by sputtering, and of a commercially available polyethylene net is used. The carbon nonwoven is pressed in individual pieces (11) (80 mm×120 mm) onto the net (12), so that the division sketched in FIG. 5 results, in which the carbon nonwoven pieces are separated from one another by gaps. The side sputtered with platinum faces away from the side laminated with the polyethylene net The laminate is used in Example 2 in place of the carbon fabric. By contrast to Example 2, the coating solution does not, however, contain any catalyst. The laminate is contacted via the carbon nonwoven side with the membrane. The resulting laminate consists of a membrane (13) which is provided on both faces with isolated carbon fabric pieces (14). Using a combination of continuously operating shears (commercially available perforation tools), this laminate is cut along the lines (15). This gives laminate pieces (FIG. 7) whose rim (16) represents only a freestanding membrane and which are coated inside of the rim with catalyst-containing carbon fabric (17). These pieces are particularly suitable as membrane/electrode assemblies for stacking in membrane fuel cells, because the freestanding and smooth rim can be sealed gas-tight—if necessary with the use of conventional, elastic gaskets. The laminate is incorporated as a membrane/electrode assembly into a membrane fuel cell and delivers there in hydrogen/oxygen operation (each at 2 bar, 80° C.) a maximum electric power of 2.9 kW/m².

Example 4

Figure 8:
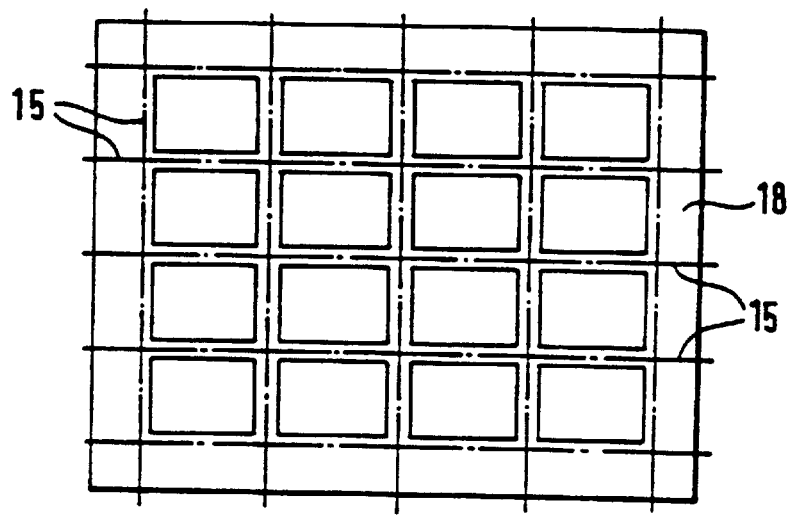
FIG. 8 shows the product made by the apparatus of FIG. 3.
Figure 9:
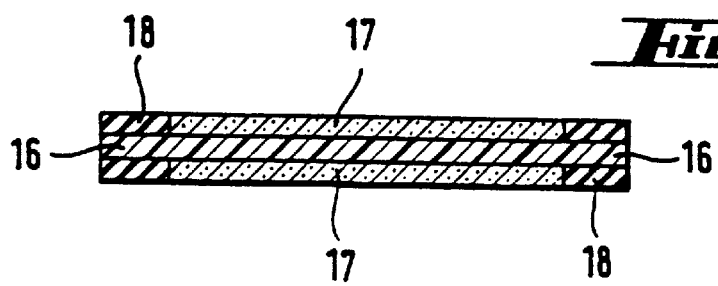
FIG. 9 shows a side view of a membrane/electrode assembly with a lateral gas seal.

A laminate obtained according to Example 1 is imprinted with a silicone rubber solution (Sylgard™, DOW) in an industrially usual, continuously running gravure printing process. The printing unit is integrated directly downstream of the oven and produces on the laminate a grid (FIG. 8) of gummed areas (18) in which the carbon fabric is fully impregnated with silicone rubber. By means of a combination of continuously operating shears (commercially available perforation tools), this laminate is cut along the lines (15). In this way, membrane/electrode assemblies with an integrated, lateral gas seal (18) are obtained (FIG. 9).

Example 5

Comparison experiment with Example 1. Membrane material, coating material, carbon fabric and quantitative data as Example 1.

Figure 10:
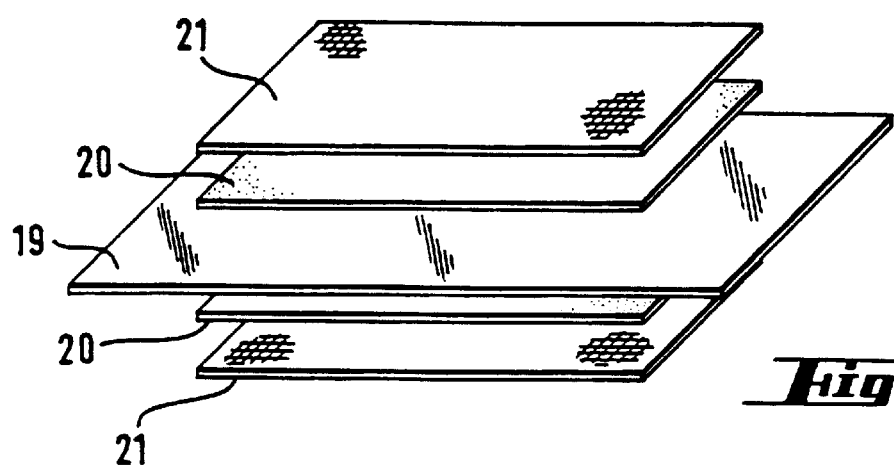
FIG. 10 shows a laminate made by a comparative process.

Procedure: Membrane material 19 (200×200 mm²), coating material (20) (180×180 mm², applied by box-type blade) and carbon fabric (21) (180×180 mm²) are pressed to one another as shown in FIG. 10 (p=10⁹ Pa, t=30 minutes, T=80° C.).

Determination of the a.c. resistance of laminates: For the measurement, the laminate is clamped in between the two halves of a steel block with a cylindrical bore of 40 mm diameter. This bore is lined with steel mats. The topmost steel mat protrudes by 0.2 mm from the bore. The mesh width of the mat is 0.5 mm. The electrodes protrude by 5 mm beyond the edge of the steel mat. In this case, the conditions of the test fuel cell are simulated, and the MEA is incorporated in the ready-to-operate state in order to adapt the conditions to the test fuel cell. After the laminate has been clamped in between the halves of the steel block, these were pressed together by means of screws having an M12 thread. For uniform loading, washers are inserted as springs between the steel block and nuts. Before the nuts are tightened, a square-wave voltage of 1 kHz is applied to the laminate for a measurement of the a.c. resistance. The measuring voltage (as $V_{SS}$) is in the range below 12 volts. For the measurement, a Voftcraft LCR measuring instrument of type 4090 is used. The nuts are then slowly tightened crosswise until there is no longer any noticeable change in the a.c. resistance. The final resistance is read off after a balancing phase of 3 minutes. The deviation of the a.c. resistances of the laminates produced according to the invention is in the range of <10%, especially <5%.

What is claimed is:

1. A process for producing laminates which contain one centrally arranged, ion-conductive membrane which is, at least over a substantial part of at least on of its two mutually opposite flat faces, electrically conductively bonded to at least one catalytically active substance and to at least one two-dimensional, gas-permeable, electron-conductive contacting material, the bonding of at least two of the said components having been effected by lamination, which comprises carrying out the bonding of the ion-conductive membrane, of the catalytically active substance and of the electron-conductive contacting material continuously.

2. The process as claimed in claim 1, where in the ion-conductive membrane is brought together with at least the electron conductive contacting material in the exact position by means of transport and feeding devices and at least the two components are laminated and bonded to one another by pressing them together.

3. The process as claimed in claim 1, wherein the lamination is effected by means of rollers exerting a pressure.

4. The process as claimed in claim 1, wherein the ion-conductive membrane and/or the contacting material is/are fed and processed in ribbon form.

5. The process as claimed in claim 1, wherein the electron-conductive contacting material and/or at least one of the flat faces of the ion-conductive membrane is/are coated with a catalytically active substance.

6. The process as claimed in claim 1, wherein a cation-conductive membrane is used as the ion-conductive membrane.

7. The process as claimed in claim 1, wherein the ion-conductive membrane is used as a membrane which contains a polymer from the group comprising the polyaryletherketones, polyarylene sulfides, polyarylether-sulfones, poly-(1,4-phenylene)s and polybenzimidazoles or from the group comprising the sulfonated polyaramides or a completely fluorinated polymer.

8. The process as claimed in claim 1, wherein the catalyst used is a platinum, gold, rhodium, iridium or ruthenium catalyst.

9. The process as claimed in claim 1, wherein the electron-conductive contacting material used is a two-dimensional carbon fiber structure from the group comprising carbon paper, carbon nonwoven, carbon fabric, carbon felt or composite carbon fiber structures or metals.

10. The process as claimed in claim 9, wherein the contacting material used is a two-dimensional graphitized carbon fiber structure.

11. The process as claimed in claim 9, wherein the contacting material used is a two-dimensional carbon fiber structure whose fibers and contact points of the fibers are additionally coated with a layer of carbon.

12. The process as claimed in claim 1, wherein the ion-conductive membrane is laminated on at least one of its flat faces to an electron-conductive contacting material.

13. The process as claimed in claim 12, wherein the ion-conductive membrane is bonded to a different contacting material on each of its flat faces.

14. The process as claimed in claim 12, wherein the ion-conductive membrane is laminated on both of its flat faces to an electron-conductive contacting material carrying a catalyst, the contacting material for one face of the membrane carrying a catalyst which is different from that carried by the contacting material for the other face of the membrane.

15. The process as claimed in claim 12, wherein the membrane/electrode assembly is produced by bonding two laminates, each composed of an ion-conductive membrane and an electron-conductive contacting material, by lamination at the ion-conductive surfaces.

16. The process as claimed in claim 1, wherein, for bonding the components, the electron-conductive material or at least one flat face of the membrane or both components are continuously coated with a solvent or a polymer solution.

17. The process as claimed in claim 16, wherein the adhesion-promoting coating material contains the catalyst.

18. The process as claimed in claim 16, wherein a polymer solution, which contains the membrane-forming, ion-conductive polymer, is used for coating.

19. The process as claimed in claim 1, wherein the components which are to be laminated are brought together in the intended manner by means of feeding and positioning devices and are laminated at a temperature in the range from 5 to 300° C.

20. The process as claimed in claim 1, wherein the components which are to be laminated are brought together in the intended manner by means of feeding and positioning devices and are laminated at a pressure in the range from $10^7$ to $10^{12}$ Pa.

21. The process as claimed in claim 1, wherein the laminates obtained are freed of still adhering, superfluous constituents in a continuous stage downstream of the lamination and coupled thereto.

22. The process as claimed in claim 21, wherein the laminate is passed through a heated drying section at a temperature in the range from 10 to 250° C.

23. The process as claimed in claim 21, wherein the superfluous constituents are removed in a downstream washing step and the laminate is subsequently dried.

24. The process as claimed in claim 1, wherein, in a continuous stage downstream of the lamination, sealing materials are applied to the outer rim zones of the laminate, along which a seal against fluids and gases is necessary during later use.

25. The process as claimed in claim 1, wherein the laminate is divided in a process downstream of the lamination at corresponding distances which are adapted to the intended further use.

26. A laminate produced by a process as claimed in claim 1, wherein the range of variation of the a.c. resistance of the laminates of one series is +10%.

27. A laminate as claimed in claim 26, which is a membrane/electrode assembly.

28. The use of a laminate produced as claimed in claim 1 in fuel cells or electrolysers.

* * * * *